United States Patent
Lu

(10) Patent No.: US 11,010,028 B2
(45) Date of Patent: May 18, 2021

(54) ALWAYS-ON DISPLAY APPLICATIONS AND APPARATUS

(71) Applicant: BEIJING XIAOMI MOBILE SOFTWARE CO., LTD., Beijing (CN)

(72) Inventor: Haixu Lu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/740,362

(22) Filed: Jan. 10, 2020

(65) Prior Publication Data
US 2020/0401298 A1 Dec. 24, 2020

(30) Foreign Application Priority Data
Jun. 21, 2019 (CN) .......................... 201910543837.3

(51) Int. Cl.
*G06F 3/0484* (2013.01)
*G06F 3/0488* (2013.01)
*H04M 1/725* (2021.01)
*H04M 1/724* (2021.01)

(52) U.S. Cl.
CPC ...... *G06F 3/04842* (2013.01); *G06F 3/04886* (2013.01); *H04M 1/724* (2021.01)

(58) Field of Classification Search
CPC ..... G06F 3/0484; G06F 3/0488; H04M 1/725
See application file for complete search history.

(56) References Cited

U.S. PATENT DOCUMENTS

| | | | |
|---|---|---|---|
| 2007/0035661 A1* | 2/2007 | Resner | G06F 1/3203 348/468 |
| 2010/0146384 A1 | 6/2010 | Peev et al. | |
| 2010/0269040 A1 | 10/2010 | Lee | |
| 2017/0131778 A1* | 5/2017 | Iyer | H04M 1/72519 |
| 2018/0121060 A1* | 5/2018 | Jeong | G06F 3/04842 |
| 2018/0217732 A1 | 8/2018 | Wang et al. | |
| 2018/0367491 A1* | 12/2018 | Agrawal | H04W 4/12 |

FOREIGN PATENT DOCUMENTS

| | | | |
|---|---|---|---|
| EP | 3355165 A1 | 8/2018 | |
| GB | 2488109 A | * 8/2012 | ......... H04N 21/6131 |

OTHER PUBLICATIONS

"Uber, Lyft Implement New Safety Measures After Student's Death", published on Apr. 19, 2019 to https://www.autoblog.com/2019/04/19/uber-lyft-new-safety-measures-after-student-death/, retrieved on Jul. 31, 2020 (Year: 2019).*

(Continued)

*Primary Examiner* — Shourjo Dasgupta
(74) *Attorney, Agent, or Firm* — Syncoda LLC; Feng Ma

(57) ABSTRACT

A method for applying an always-on interface includes: displaying a first always-on interface, wherein the first always-on interface is an interface displayed when a terminal is in the always-on display state, and the first always-on interface includes a target control which is used to call out a target function item; receiving a first selection operation on the target control; and displaying an intermediate state interface according to the first selection operation, and the intermediate state interface is an interface displayed when the terminal is in the half always-on display state.

18 Claims, 10 Drawing Sheets

(56) References Cited

OTHER PUBLICATIONS

Ian Blair, "What Is a Push Notification? and Why It Matters?", published on Mar. 9, 2018 to https://buildfire.com/what-is-a-push-notification/, retrieved on Jul. 31, 2020 (Year: 2018).*

"Enable Uber Notifications in You Phone and Improve Your Experience", published on Sep. 25, 2017 to https://www.uber.com/en-TT/blog/enable-uber-notifications/, retrieved on Jul. 31, 2020 (Year: 2017).*

Extended European search report of counterpart EP application No. 20152651.4 dated Jul. 16, 2020.

\* cited by examiner

ALWAYS-ON DISPLAY APPLICATIONS AND APPARATUS

CROSS-REFERENCE TO RELATED APPLICATION

This application claims priority to Chinese Patent Application 201910543837.3 filed on Jun. 21, 2019, the disclosure of which is hereby incorporated by reference in its entirety.

BACKGROUND

Always-on Display (AOD) is a common system function in many terminals. When a user locks and performs an always-on process on a screen of the terminal, the terminal enters the always-on state, when the display screen of the terminal is in a fully darkened state. In the AOD state, the display screen of the terminal can display information such as time, date, notification, and the user can obtain such basic information in real time without the need for a bright screen.

SUMMARY

The present disclosure relates generally to the field of interface display technologies, and more specifically to a method, device and readable storage medium for applying an always-on interface.

According to a first aspect of the present disclosure, there is provided a method for applying an always-on interface, wherein the method includes:

displaying a first always-on interface, wherein the first always-on interface is an interface displayed when a terminal is in an always-on display state, and the first always-on interface includes a target control for calling out a target function item in the first always-on interface;

receiving a first selection operation on the target control; and displaying an intermediate state interface according to the first selection operation, wherein the intermediate state interface includes an interaction area of the target function item, and the intermediate state interface is an interface displayed when the terminal is in a half always-on display state, and wherein the half always-on display state is used to indicate that the terminal is in a state between the always-on display state and a screen-locked state.

According to another aspect of the present disclosure, there is provided a computer device, wherein the computer device includes a processor and a memory, and at least one instruction, at least one program, a set of codes or a set of instructions is stored on the memory, and is loaded and executed by the processor to implement the method for applying an always-on interface in the above aspect.

According to another aspect of the present disclosure, there is provided a computer readable storage medium, wherein at least one instruction, at least one program, a set of codes or a set of instructions is stored on the readable storage medium, and is loaded and executed by the processor to implement the method for applying an always-on interface in the above aspect.

It is to be understood that both the foregoing general description and the following detailed description are exemplary and explanatory only and are intended to limit the present disclosure.

BRIEF DESCRIPTION OF THE DRAWINGS

The drawings herein are incorporated in and constitute a part of this disclosure, showing embodiments consistent with the present disclosure, and explaining the principles of the present disclosure together with the description.

DETAILED DESCRIPTION

Figure 1:
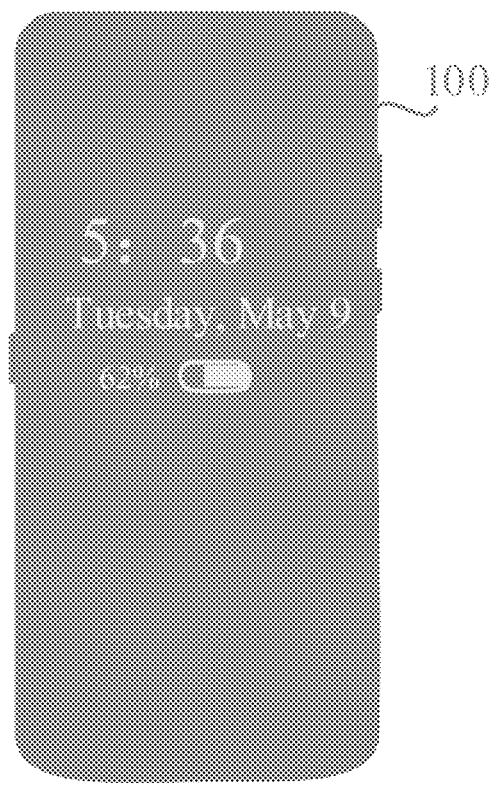
FIG. 1 is a schematic diagram of the interface when the terminal is in the always-on display state according to some embodiments of the present disclosure.

Reference will now be made in detail to exemplary embodiments/aspects, examples of which are illustrated in the accompanying drawings. The following description refers to the accompanying drawings in which the same numbers in different drawings may represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

A terminal can be switched among an always-on display state, a screen-locked state, and a normal state. The always-on display state is a state that the terminal has an always-on display and displays the basic information such as time and date; the screen-locked state is a state that the terminal has a bright screen and displays the screen-locked interface; and the normal state is a state that the terminal has a bright screen and is unlocked.

However, in the above state switching, when the terminal is in the always-on display state, the basic information can only be displayed, and the interactive operation needs to be completed in the screen-locked display state or the normal display state after the bright screen is displayed. The utilization efficiency of the terminal is low in the always-on display state.

Various embodiments of the present disclosure can include a target control added in the always-on interface, and when a first selection operation on the target control is received, the state of the terminal is switched from the always-on display state to the half always-on display state, and thus a target function item is applied in the intermediate state interface of the half always-on display state, and the application modes of the always-on interface are increased by increasing the intermediate state interface of the half always-on display state, which improves the utilization efficiency of the always-on interface.

A brief introduction to the terms involved in various embodiments of the present disclosure can be provided.

The always-on interface refers to an interface which is displayed by means of an Always-on Display (AOD) technology. The AOD refers to the fact that when the user locks and performs an always-on processing on the screen of the terminal, the terminal enters the always-on display state, and displays information such as time, date, notification in the full black display screen, and thus the user can obtain the basic information in real time without the need for a bright screen. Alternatively, when the always-on interface is displayed, the terminal is in the always-on display state. Generally, when the terminal is in the always-on state, the display screen is in the full black state; and when the AOD is turned on, the displaying area of the information such as time and date in the display screen emits light of other colors, and the other areas in the display screen remain in the full black state. Alternatively, the display screen of the terminal supporting the AOD is an Organic Light-Emitting Diode (OLED) display.

Alternatively, the state that the terminal is in includes any of an always-on display state, a screen-locked state, and a normal state.

The always-on display state is a state that the terminal has an always-on display and displays the basic information such as time and date. Illustratively, referring to FIG. 1, the display screen 100 of the terminal has an always-on display and displays time, date and power information.

Figure 2:
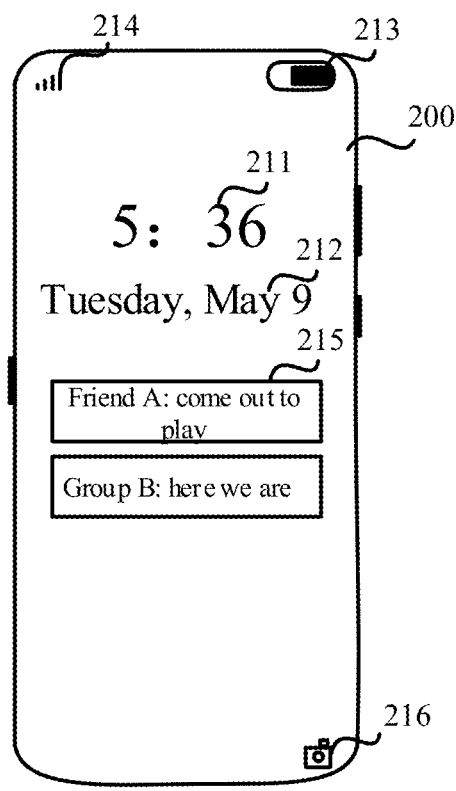
FIG. 2 is a schematic diagram of the interface when the terminal is in the screen-locked state according to some embodiments of the present disclosure.

The screen-locked state is a state that the terminal has a bright screen and displays a screen-locked interface. Illustratively, referring to FIG. 2, the terminal has a bright display screen and displays a screen-locked interface 200, and the screen-locked interface 200 displays time 211, date 212, power 213, signal 214, notification message 215, camera control 216, and the like.

Figure 3:
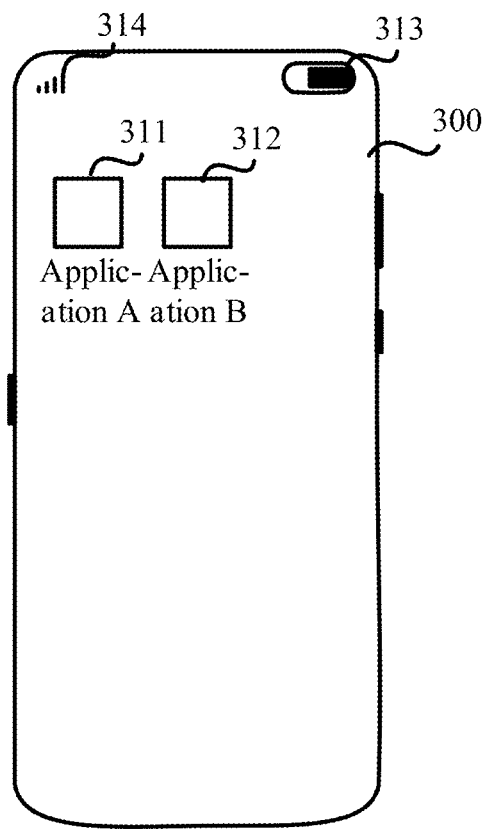
FIG. 3 is a schematic diagram of the interface when the terminal is in the normal state according to some embodiments of the present disclosure.

The normal state is a state that the terminal has a bright screen and is unlocked. Illustratively, referring to FIG. 3, the terminal has a bright display screen and displays a main interface 300 of the terminal operating system, and the main interface 300 displays an icon 311 of application A, an icon 312 of application B, power 313, signal 314, and the like.

Figure 4:
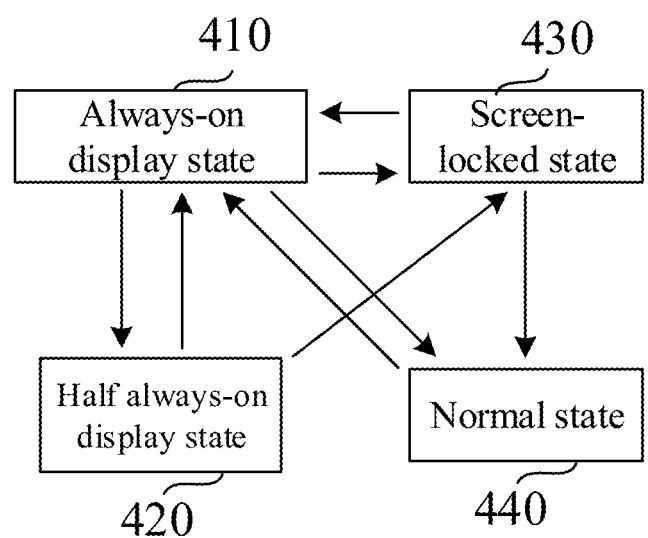
FIG. 4 is a schematic diagram of the switching logic of a terminal switched among multiple states according to some embodiments of the present disclosure.

Alternatively, in an embodiment of the present disclosure, the state that the terminal is in may also be a half always-on display state, and the half always-on display state is used to indicate a state between the always-on display state and the screen-locked state. The terminal may be switched between the always-on display state and the screen-locked state, or may be switched between the always-on display state and the half always-on display state, or may be switched between the half always-on display state and the screen-locked state. Illustratively, the manner in which the terminal is switched among the states is as shown in FIG. 4. As shown in FIG. 4, the terminal may be switched among an always-on display state 410, a half always-on display state 420, a screen-locked state 430, and a normal state 440. The always-on display state 410 and the half always-on display state 420 may be switched to each other, the always-on display state 410 and the screen-locked state 430 may be switched to each other. The half always-on display state 420 may be switched to the screen-locked state 430, the screen-locked state 430 may be switched to the normal state 440, and the normal state 440 may be switched to the always-on display state 410. Alternatively, the always-on display state 410 may also be directly switched to the normal state 440.

Figure 5:
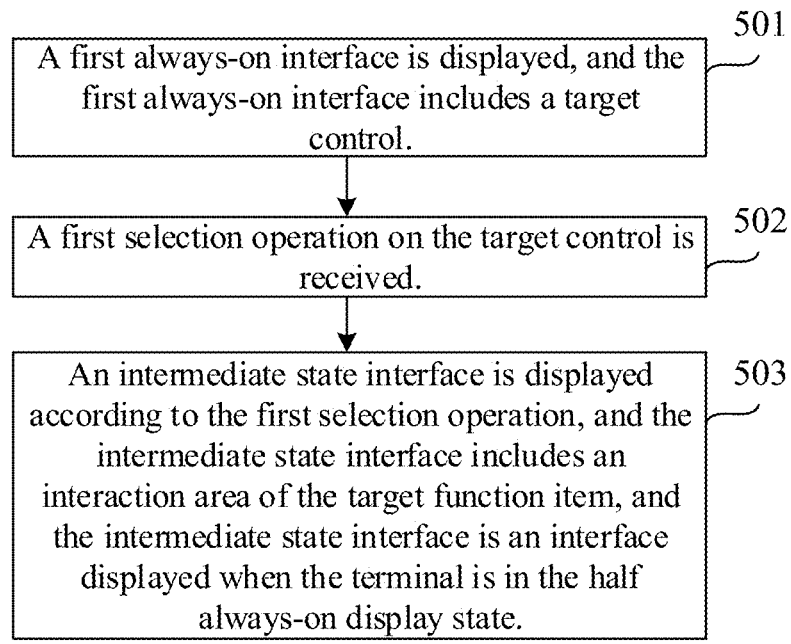
FIG. 5 is a flowchart of the method for applying an always-on interface according to some embodiments of the present disclosure.

The method for applying an always-on interface according to the embodiment of the present disclosure is described in conjunction with the above-mentioned description for the nouns. FIG. 5 is a flowchart of the method for applying an always-on interface according to some embodiments of the present disclosure. The method includes step 501, step 502, and step 503.

In step 501, a first always-on interface is displayed, and the first always-on interface includes a target control.

Alternatively, the first always-on interface is an interface displayed when the terminal is in the always-on display state. Alternatively, the target control is used for calling out a target function item in the first always-on interface.

Alternatively, the first always-on interface includes a control corresponding to the callable function item of the first always-on interface, and the callable function item includes the target function item described above, and the first always-on interface includes a target control.

Alternatively, before the first always-on interface displays the target control, a to-be-expanded control may also be displayed in the first always-on interface. When the terminal receives a selection operation for the to-be-expanded control, the to-be-expanded control is expanded to the controls corresponding to each of the callable function items, including the above target control.

Alternatively, the target function item includes a first content viewing function item, and the target control includes a viewing control. Alternatively, the first content viewing function item is used for displaying the first content. The first content includes at least one of a target to-do list, a target schedule, a timing progress of a timer, a sound recording state, a music playing state, or a network car booking state.

Alternatively, the target function item further includes a second content editing function item, and the target control includes a creating and editing control. Alternatively, the second content editing function item is used for editing the second content.

Alternatively, the target function item may further include a notification message viewing function item, and the target control includes a notification message prompting control, and the notification message prompting control is a control displayed when the terminal receives a target notification message.

Illustratively, the target control includes at least one of a new note control, a new to-do list control, a to-do list viewing control, a new schedule control, a schedule viewing control, a timing viewing control, a recording viewing control, a music playing control, and a network car viewing control, and a notification message prompting control. The new note control is used for calling out a new note function item, the new to-do list control is used for calling out a new to-do list function item, the to-do list viewing control is used for calling out a to-do list viewing function item, the new schedule control is used for calling out a new schedule function item, the schedule viewing control is used for calling out a schedule viewing function item, the timing viewing control is used for calling out a timing viewing function item, the recording viewing control is used for calling out a recording viewing function item, the music playing control is used for calling out a music playing function item, and the network car viewing control is used for calling out a network car viewing function item, and the notification message prompting control is used for calling out a notification message viewing function item. The to-do list viewing control is a control displayed when the alarm time of the target to-do list is reached; the schedule viewing control is a control displayed when the alarm time of the target schedule is reached; and the notification message prompting control is a control displayed when the terminal receives the target notification message.

Alternatively, in order to prevent screen burn, the display content in the first always-on interface is displayed in a positionally variable manner in the first always-on interface.

In step 502, a first selection operation on the target control is received.

Alternatively, the first selection operation may be implemented as any one of a single-click operation, a double-click operation, a long-press operation, a drag operation, and a slide operation. When the terminal is implemented as a mobile terminal such as a mobile phone or a tablet computer, the display screen of the terminal may be implemented as a touch display screen, and the terminal receives a first selection operation triggered by the user touching the touch display screen. When the terminal is implemented as a desktop computer or a portable laptop computer, the terminal receives the first selection operation inputted by the user through an external input device (e.g., a mouse, a keyboard, etc.).

In step 503, an intermediate state interface is displayed according to the first selection operation, and the intermediate state interface includes an interaction area of the target function item, and the intermediate state interface is an interface displayed when the terminal is in the half always-on display state.

Alternatively, the half always-on display state is used to indicate that the terminal is in a state between the always-on display state and a screen-locked state.

Alternatively, when the terminal is in the half always-on display state, the half always-on display state may be switched to the always-on display state, or the half always-on display state may be switched to the screen-locked state.

Alternatively, the intermediate state interface includes an interaction area of the target function item, and the interaction area is used for displaying information of the target function item, and/or the interaction area is used for receiving an input operation of the user and generating the corresponding content according to the input operation.

Alternatively, when the target function item includes a first content viewing function item, the intermediate state interface includes a displaying area of the first content; when the target function item includes a second content editing function item, the intermediate state interface includes an editing area of the second content; alternatively, when the target function item includes a notification message viewing function item, the intermediate state interface includes a displaying area of the target notification message.

Alternatively, the editing area of the second content includes at least one of a note editing area, a to-do list editing area, or a schedule editing area.

Illustratively, when the target function item is a new note function item, the intermediate state interface includes a note editing area. When the target function item is a new to-do list function item, the intermediate state interface includes a to-do list editing area. When the target function item is a to-do list viewing function item, the to-do list viewing control is a control displayed when the alarm time of the target to-do list is reached, and the intermediate state interface includes a displaying area of the target to-do list. When the target function item is a new schedule function item, the intermediate state interface includes a schedule editing area. When the target function item is a schedule viewing function item, the schedule viewing control is a control displayed when the alarm time of the target schedule is reached, and the intermediate state interface includes a displaying area of the target schedule. When the target function item is a timing viewing function item, the intermediate state interface includes a displaying area of the timing progress. When the target function item is a recording viewing function item, the intermediate state interface includes a controlling area of the sound recording state. When the target function item is a music playing function item, the intermediate state interface includes a controlling area of the audio playing. When the target function item is a network car viewing function item, the intermediate state interface includes a network car booking state viewing area. When the target function item is a message viewing function item, the notification message prompting control is a control displayed when the terminal receives a target notification message, and the intermediate state interface includes a displaying area of the target notification message.

Illustratively, the new note function item, the timing viewing function item, the network car viewing function item, and the notification message prompting function item are taken as an example for illustration, respectively.

Figure 6:
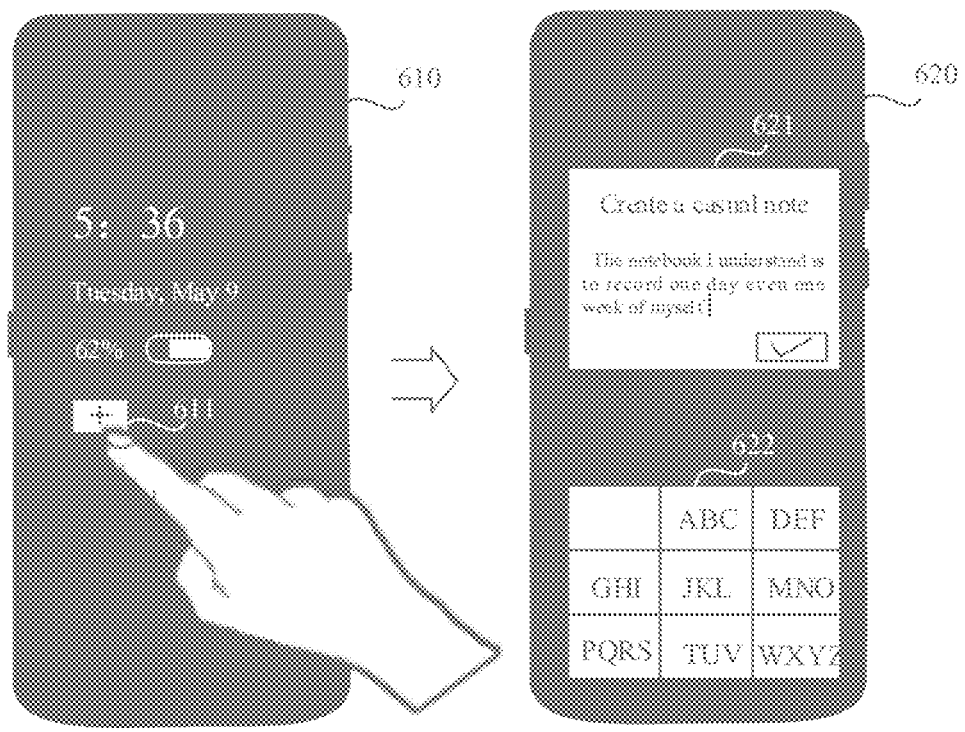
FIG. 6 is a schematic diagram of the interface when the target function item is a new note function item based on the embodiment illustrated in FIG. 5.

First, when the target function item is implemented as a new note function item, as shown in FIG. 6, a first always-on interface 610 displays a new note control 611. After a click operation on the new note control 611 is received, an intermediate state interface 620 is displayed. The intermediate state interface 620 includes a note editing area 621 and a keyboard 622, and the editing for the content of the note is realized by an input operation in the keyboard 622.

Figure 7:
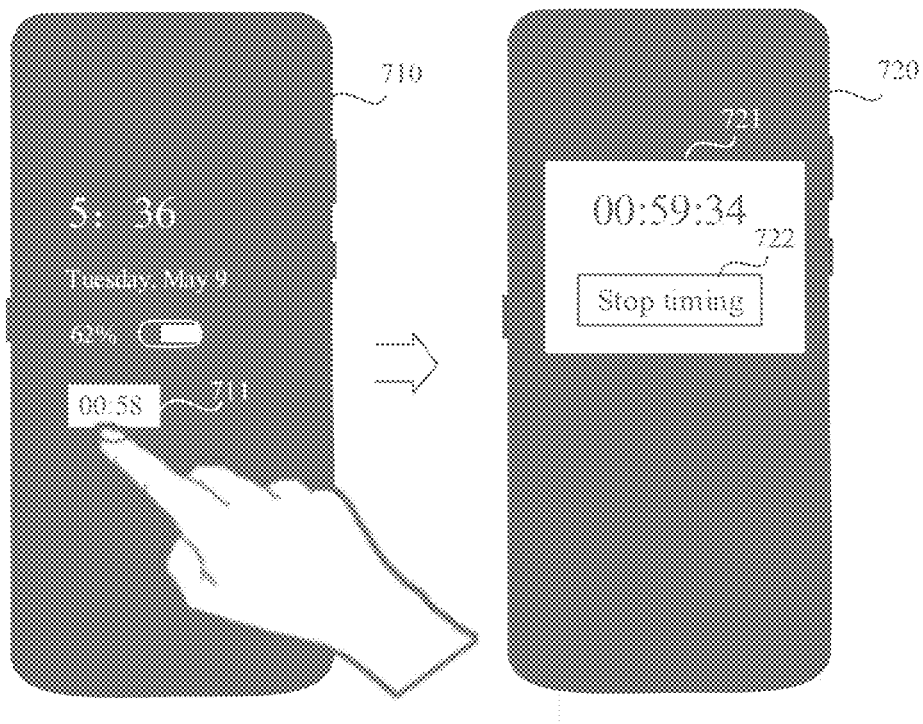
FIG. 7 is a schematic diagram of the interface when the target function item is a timing viewing function item based on the embodiment illustrated in FIG. 5.

Second, when the target function item is implemented as a timing viewing function item, as shown in FIG. 7, a first always-on interface 710 displays a timing viewing control 711, and the timing viewing control 711 displays a timing summary progress. After a click operation on the timing viewing control 711 is received, an intermediate state interface 720 is displayed. The intermediate state interface 720 includes a displaying area 721 of the timing progress, and a current timing progress is displayed in the displaying area 721 of the timing progress. Alternatively, the displaying area 721 of the timing progress further includes a timing controlling control 722 for controlling the start and/or stop of the timing progress. Alternatively, the timing accuracy of the timing summary progress is lower than the timing accuracy in the displaying area 721 of the timing progress.

Figure 8:
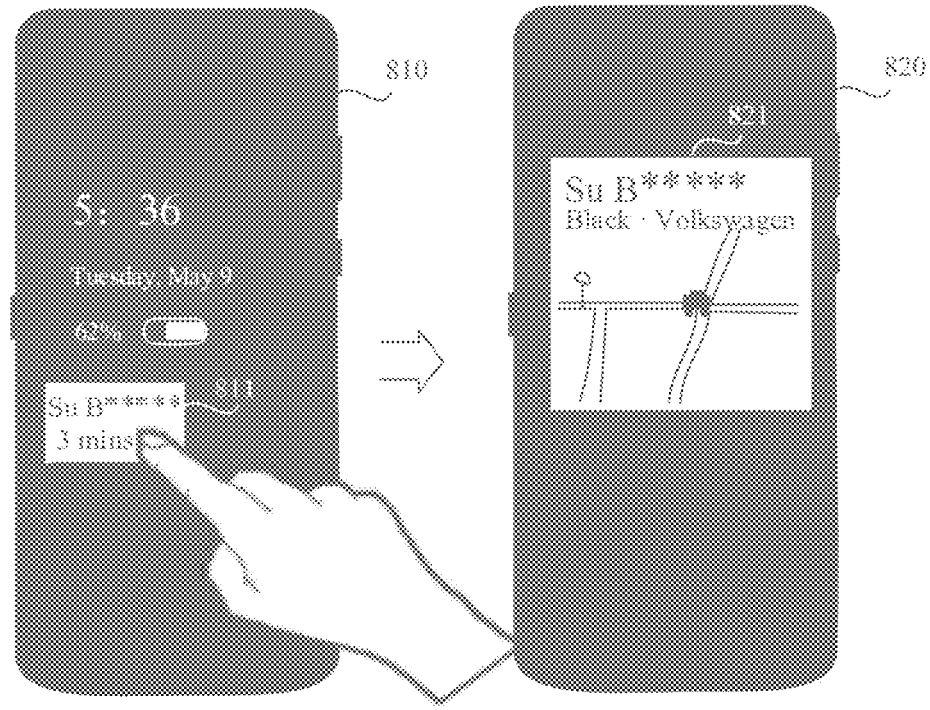
FIG. 8 is a schematic diagram of the interface when the target function item is a network car viewing function item based on the embodiment illustrated in FIG. 5.

Third, when the target function item is implemented as ride sharing, taxi cab calling, or transportation App, a network vehicle viewing function item can be displayed, as shown in FIG. 8, the first always-on interface 810 displays a network car viewing control 811. Alternatively, the network car viewing control 811 displays the basic information (e.g., the license plate number, the estimated time length to reach) of the reserved car. After a click operation on the network car viewing control 811 is received, an intermediate state interface 820 is displayed, and the intermediate state interface 820 includes a network car booking state viewing area 821. Alternatively, the network car booking state viewing area 821 displays the current geographic location of the reserved network car and the basic information (e.g., the license plate number, body color, brand model, etc.) of the network car.

Figure 9:
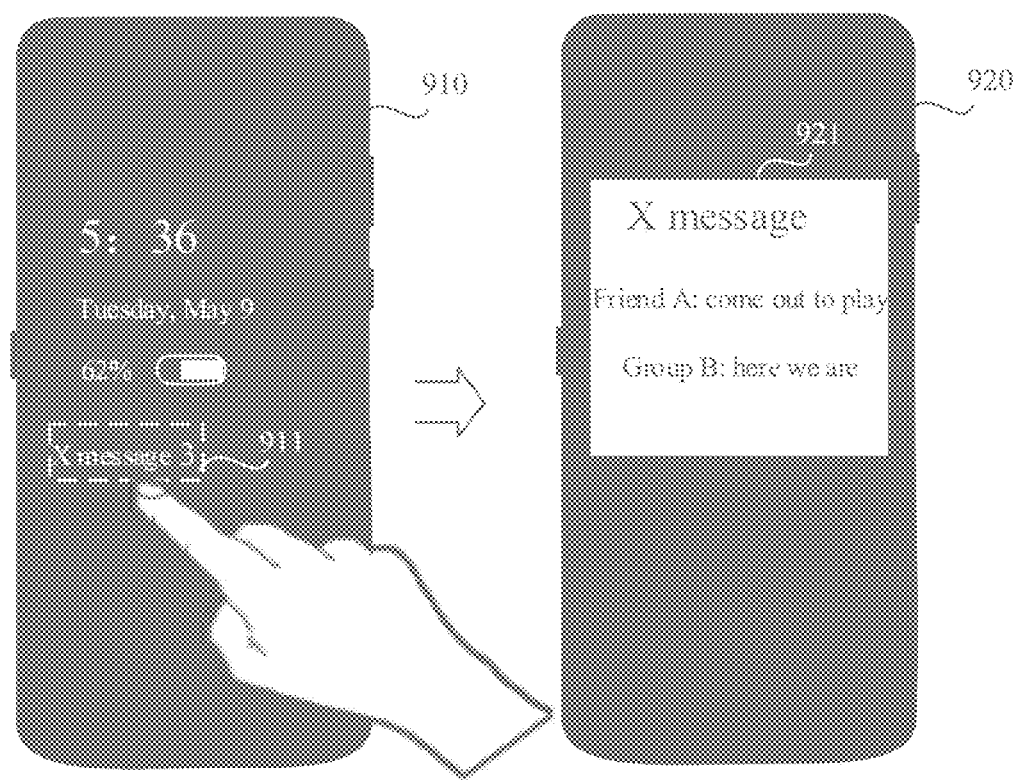
FIG. 9 is a schematic diagram of the interface when the target function item is a notification message viewing function item based on the embodiment illustrated in FIG. 5.

Fourth, when the target function item is implemented as a notification message viewing function item, as shown in FIG. 9, the first always-on interface 910 displays a notification message prompting control 911, and the notification message prompting control 911 is a control displayed when the terminal receives the target notification message. After a click operation on the notification message prompting control 911 is received, an intermediate state interface 920 is displayed, and the intermediate state interface 920 includes a displaying area 921 of a target notification message. Alternatively, the target notification message is a message received by a target application, and other messages received by the target application may also be displayed in the displaying area 921 of the target notification message. Alternatively, when the terminal displays the notification message prompting control 911 in the first always-on interface 910, a plurality of different prompting controls may be displayed according to different types of the target notification messages, for example, a prompting control a is displayed for the target notification message received by the application A; a prompting control b is displayed for the target notification message received by the application B; and a prompting control c is displayed for the target notification message such as the missed call. Alternatively, for the number of different types of target notification messages received by the terminal, the digital value corresponding to the number is correspondingly displayed in the notification message prompting control 911.

In view of the above, with respect to the method for applying an the always-on interface according to this embodiment, a target control is added in the always-on interface, and when a first selection operation on the target control is received, the state of the terminal is switched from the always-on display state to the half always-on display state, and thus a target function item is applied in the intermediate state interface of the half always-on display state, and the application modes of the always-on interface are increased by increasing the intermediate state interface of the half always-on display state, which improves the utilization efficiency of the always-on interface.

Figure 10:
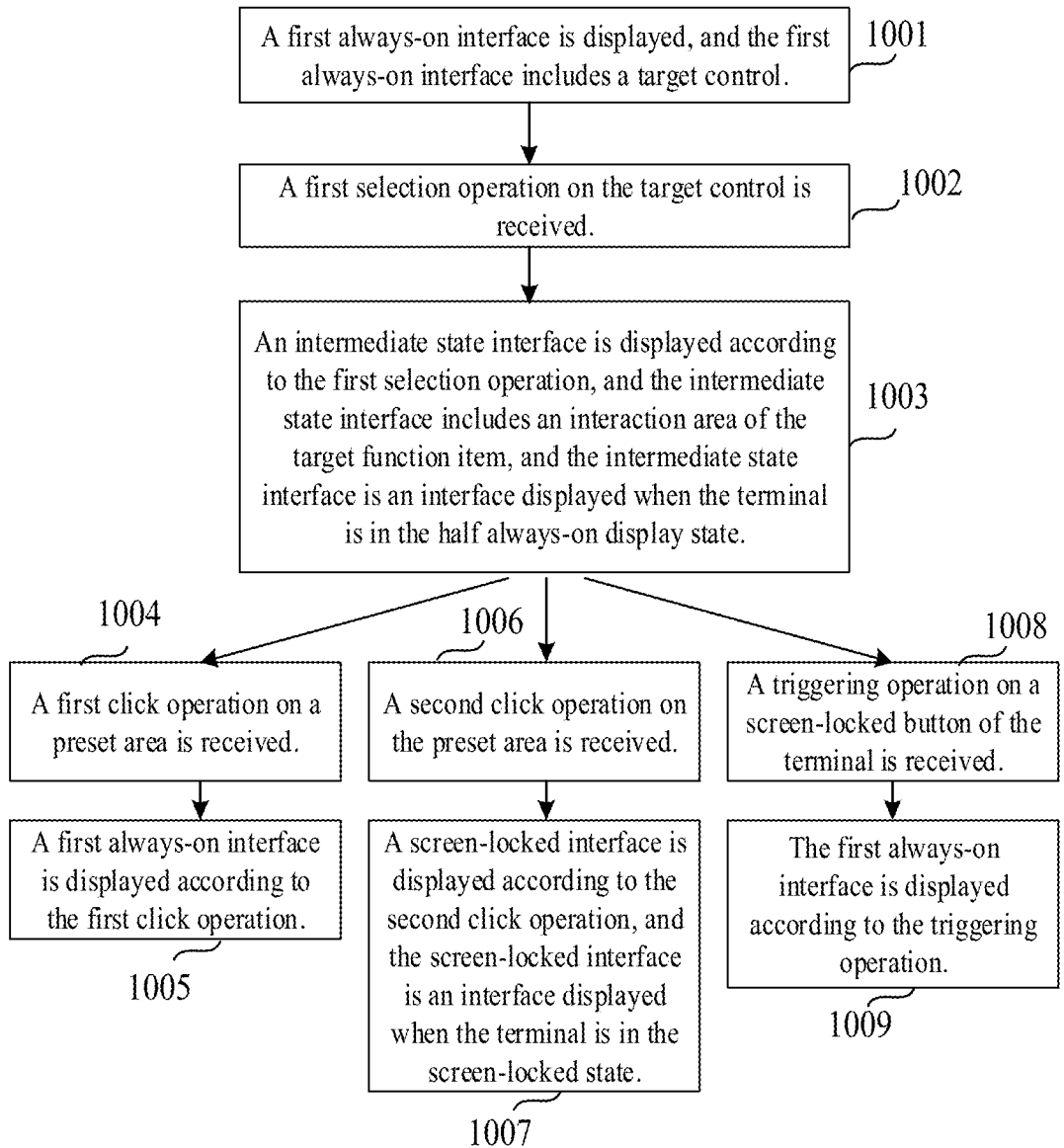
FIG. 10 is a flowchart of the method for applying an always-on interface according to another exemplary embodiment of the present disclosure.

In an alternative embodiment, the intermediate state interface in the half always-on display state may also be switched to the first always-on interface in the always-on display state or the screen-locked interface in the screen-locked state. FIG. 10 is a flowchart of the method for applying an always-on interface according to another exemplary embodiment of the present disclosure. As shown in FIG. 10, the method includes step 1001, step 1002, step 1003, step 1004, step 1005, step 1006, step 1007, step 1008, and step 1009.

In step 1001, a first always-on interface is displayed, and the first always-on interface includes a target control.

Alternatively, the first always-on interface is an interface displayed when the terminal is in the always-on display state. Alternatively, the target control is used for calling out a target function item in the first always-on interface.

Alternatively, the first always-on interface includes a control corresponding to the callable function item of the first always-on interface, and the callable function item includes the target function item, and the first always-on interface includes a target control.

It should be noted that the specific feasible manners of the foregoing target control and the target function item have been described in detail in the above step 501, which will not be described herein again.

In step 1002, a first selection operation on the target control is received.

Alternatively, the first selection operation may be implemented as any one of a single-click operation, a double-click operation, a long-press operation, a drag operation, and a slide operation.

In step 1003, an intermediate state interface is displayed according to the first selection operation, and the intermediate state interface includes an interaction area of the target function item, and the intermediate state interface is an interface displayed when the terminal is in the half always-on display state.

Alternatively, the half always-on display state is used to indicate that the terminal is in a state between the always-on display state and a screen-locked state.

Alternatively, when the terminal is in the half always-on display state, the half always-on display state may be switched to the always-on display state, or the half always-on display state may be switched to the screen-locked state.

Alternatively, the intermediate state interface includes an interaction area of the target function item. The interaction area is used for displaying information of the target function item, and/or the interaction area is used for receiving an input operation of the user and generating the corresponding content according to the input operation.

In step 1004, a first click operation on a preset area is received.

Alternatively, the preset area may be other areas than the interaction area of the target function item in the intermediate state interface, or may be a sub-area on the interaction area. When the preset area is implemented as a sub-area in the interaction area, the preset area may be implemented as an area corresponding to the return control.

Alternatively, the first click operation may be implemented as a single-click operation, or may be implemented as a double-click operation, or may be implemented as a multiple-click operation, which is not limited in the embodiment of the present disclosure. In this embodiment, the first click operation being a single-click operation is taken as an example for illustration.

In step 1005, a first always-on interface is displayed according to the first click operation.

In step 1006, a second click operation on the preset area is received.

Alternatively, the preset area may be other areas than the interaction area of the target function item in the intermediate state interface, or may be a sub-area on the interaction area. When the preset area is implemented as a sub-area in the interaction area, the preset area may be implemented as an area corresponding to the return control.

Alternatively, the second click operation may be implemented as a single-click operation, or may be implemented as a double-click operation, or may be implemented as a multiple-click operation, which is not limited in the embodiment of the present disclosure.

Alternatively, the second click operation and the first click operation are two different click operations. In this embodiment, the second click operation being a double-click operation is taken as an example for illustration.

In step 1007, a screen-locked interface is displayed according to the second click operation, and the screen-locked interface is an interface displayed when the terminal is in the screen-locked state.

Alternatively, the screen-locked state is a state that the terminal has a bright screen and is locked. Alternatively, when the terminal is in the screen-locked state, the terminal may be locked by using a face recognition technology, a fingerprint recognition technology, or a password technology; or the terminal may be locked without using the foregoing technologies. Alternatively, in the case that the terminal is locked by using the foregoing technologies, when the terminal is switched from the screen-locked state to the normal state, the terminal needs to be unlocked by using the face recognition technology, the fingerprint recognition technology, or the password decryption, thereby implementing the state switching. In the case that the terminal is locked without using the above technologies, when the terminal is switched from the screen-locked state to the normal state, it is only necessary to perform an unlock gesture operation in the screen-locked interface to implement the state switching.

Alternatively, when the terminal is locked by using the face recognition technology, the fingerprint recognition technology or the password technology, the display interface of the terminal in the normal state may be directly displayed according to the second click operation.

In step 1008, a triggering operation on a screen-locked button of the terminal is received.

Alternatively, the screen-locked button is used for switching the terminal in the states other than the always-on display state to the always-on display state.

In step 1009, the first always-on interface is displayed according to the triggering operation.

Alternatively, when the first always-on interface is displayed according to the triggering operation, an always-on processing is first performed on the display screen of the terminal according to the triggering operation, and the first always-on interface is displayed after a preset duration of the always-on processing.

Figure 11:
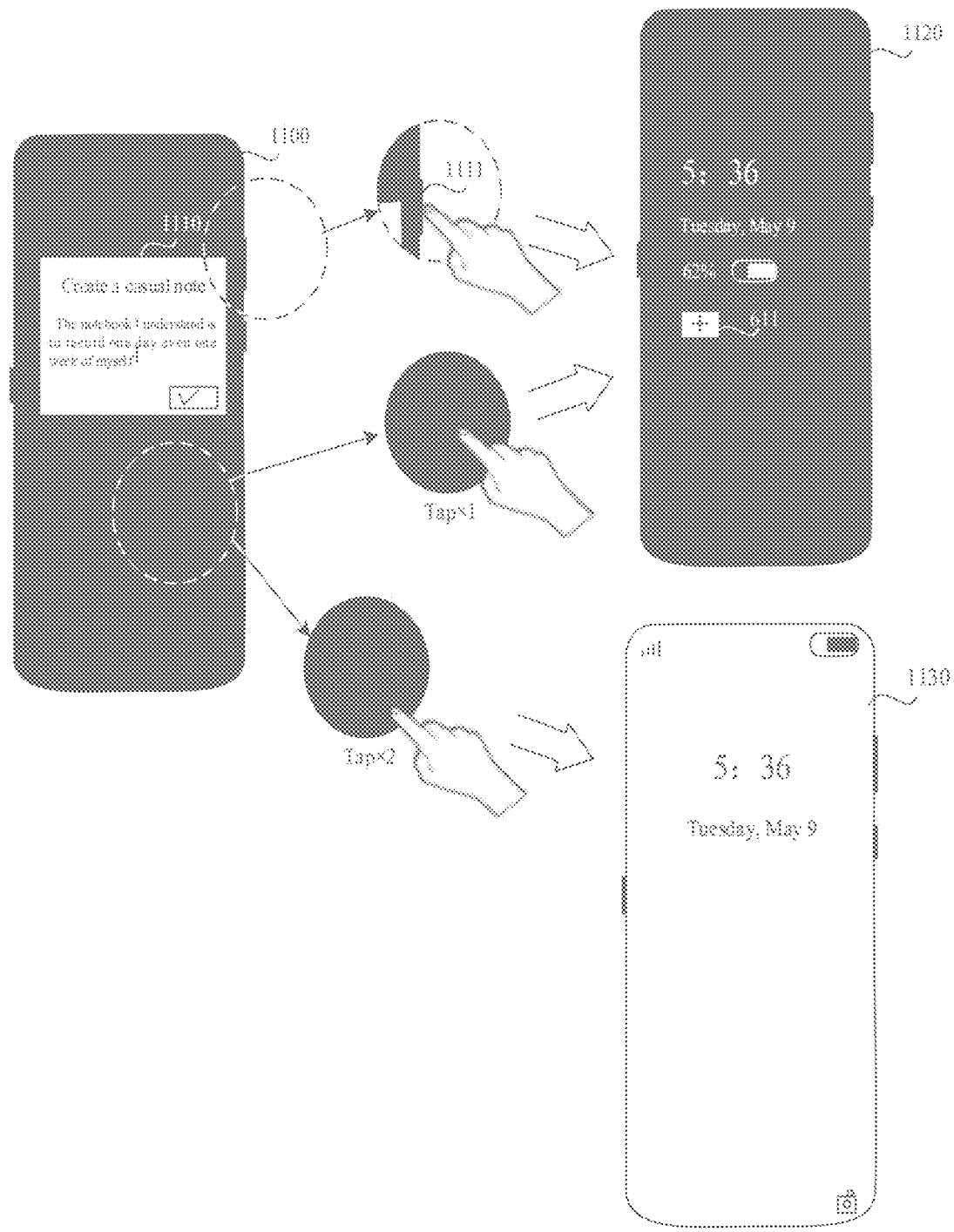
FIG. 11 is a schematic diagram of an intermediate state interface switched to the first always-on interface or the screen-locked interface based on the embodiment illustrated in FIG. 10.

Illustratively, referring to FIG. 11, the terminal currently displays an intermediate state interface 1100. The intermediate state interface 1100 includes a note editing area 1110. The first always-on interface 1120 is displayed when the user single-clicks in other areas than the note editing area 1110; the screen-locked interface 1130 is displayed when the user double-clicks in other areas than the note editing area 1110; and the first always-on interface 1120 is displayed when the user presses the screen-locked button 1111.

In view of the above, with respect to the method for applying an the always-on interface according to this embodiment, a target control is added in the always-on interface, and when a first selection operation on the target control is received, the state of the terminal is switched from the always-on display state to the half always-on display state, and thus a target function item is applied in the intermediate state interface of the half always-on display state, and the application modes of the always-on interface are increased by increasing the intermediate state interface of the half always-on display state, which improves the utilization efficiency of the always-on interface.

With respect to the method according to this embodiment, a first click operation or a second click operation is received on a preset area of the intermediate state interface, or a triggering operation on the screen-locked button of the terminal is received, so that the terminal is switched from the half always-on display state to the always-on display state or the screen-locked state, which improves the switching efficiency between the states of the terminal.

Figure 12:
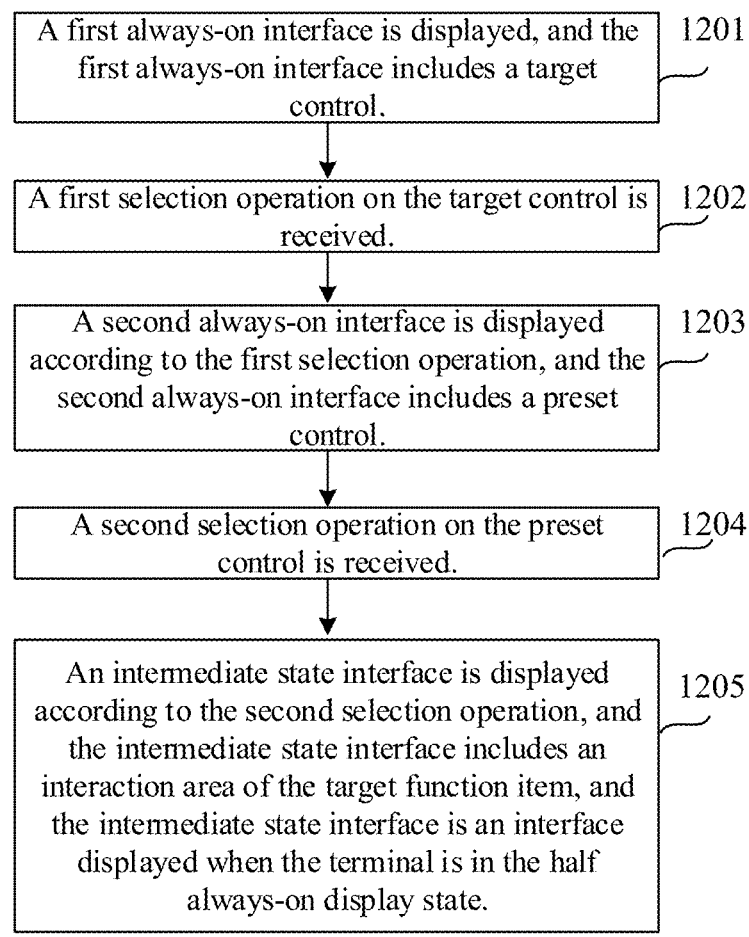
FIG. 12 is a flowchart of the method for applying an always-on interface according to another exemplary embodiment of the present disclosure.

In an alternative embodiment, the calling out of the target function item also needs to be confirmed by the preset control. FIG. 12 is a flowchart of the method for applying an always-on interface according to another exemplary embodiment of the present disclosure. As shown in FIG. 12, the method includes step 1201, step 1202, step 1203, step 1204, and step 1205.

In step 1201, a first always-on interface is displayed, and the first always-on interface includes a target control.

Alternatively, the first always-on interface is an interface displayed when the terminal is in the always-on display state. Alternatively, the target control is used for calling out a target function item in the first always-on interface.

Alternatively, the first always-on interface includes a control corresponding to the callable function item of the first always-on interface. The callable function item includes the target function item, and the first always-on interface includes a target control.

It should be noted that the specific feasible manners of the target control and the target function item have been described in detail in the above step 501, which will not be described herein again.

In step 1202, a first selection operation on the target control is received.

Alternatively, the first selection operation may be implemented as any one of a single-click operation, a double-click operation, a long-press operation, a drag operation, and a slide operation.

In step 1203, a second always-on interface is displayed according to the first selection operation, and the second always-on interface includes a preset control.

Alternatively, the second always-on interface is an interface obtained by replacing the target control in the first always-on interface with the preset control; or the second always-on interface is an interface obtained by adding the preset control on the basis of the first always-on interface.

Alternatively, the second always-on interface is an interface displayed when the terminal is in the always-on display state, and the preset control is used for confirming the calling out of the target function item.

In step 1204, a second selection operation on the preset control is received.

Alternatively, the second selection operation may be implemented as any one of a single-click operation, a double-click operation, a long-press operation, a drag operation, and a slide operation. Alternatively, the second selection operation may be the same operation as the first selection operation described above, or they may be two different types of operations.

In step 1205, an intermediate state interface is displayed according to the second selection operation, and the intermediate state interface includes an interaction area of the target function item, and the intermediate state interface is an interface displayed when the terminal is in the half always-on display state.

Alternatively, the half always-on display state is used to indicate that the terminal is in a state between the always-on display state and a screen-locked state.

Alternatively, when the terminal is in the half always-on display state, the half always-on display state may be switched to the always-on display state, or the half always-on display state may be switched to the screen-locked state.

Alternatively, the intermediate state interface includes an interaction area of the target function item, and the interaction area is used for displaying information of the target function item, and/or the interaction area is used for receiving an input operation of the user and generating the corresponding content according to the input operation.

Figure 13:
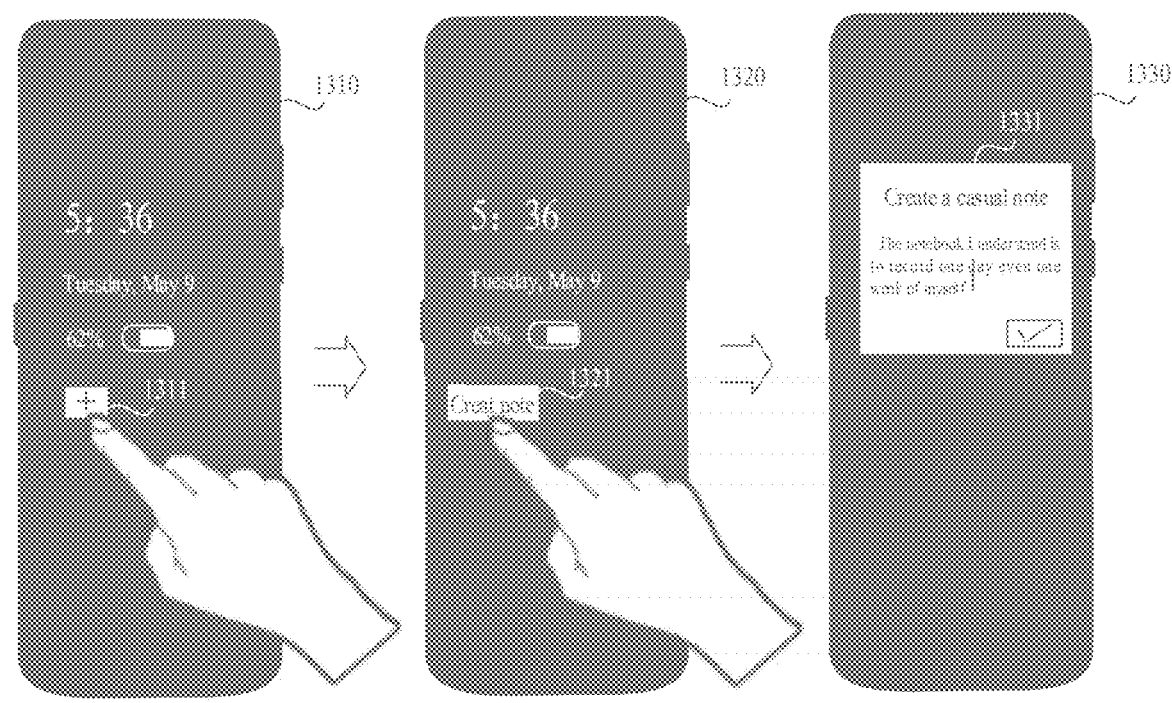
FIG. 13 is a schematic diagram of the process of the calling out of the target function item based on the embodiment illustrated in FIG. 12.

Illustratively, the target function item being a new note function item is taken as an example for illustration, referring to FIG. 13, the terminal currently displays a first always-on interface 1310. The first always-on interface 1310 includes a new note control 1311 for calling out a new note function item. After a first selection operation on the new note control 1311 is received, a second always-on interface 1320 is displayed. The second always-on interface 1320 includes a preset control 1321. The preset control 1321 displays the name "New Note" of the target function item. When a second selection operation on the preset control 1321 is received, an intermediate state interface 1330 is displayed. The intermediate state interface 1330 includes a note editing area 1331.

In view of the above, with respect to the method for applying an always-on interface according to this embodiment, a target control is added in the always-on interface, and when a first selection operation on the target control is received, the state of the terminal is switched from the always-on display state to the half always-on display state, and thus a target function item is applied in the intermediate state interface of the half always-on display state, and the application modes of the always-on interface are increased by increasing the intermediate state interface of the half always-on display state, which improves the utilization efficiency of the always-on interface.

With respect to the method according to this embodiment, when a first selection operation is performed on the target control, the preset control is displayed; and the target function item called out by the target control is confirmed by the preset control, and then the target function item is called out, so as to avoid a false touch event in the always-on interface to cause a cumbersome operation of the terminal.

Figure 14:
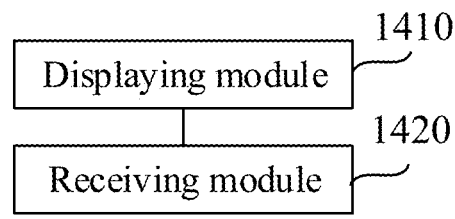
FIG. 14 is a structural block diagram of the apparatus for applying an always-on interface according to some embodiments of the present disclosure.

FIG. 14 is a structural block diagram of the apparatus for applying an always-on interface according to some embodiments of the present disclosure. As shown in FIG. 14, the apparatus includes: a displaying module 1410 and a receiving module 1420.

The various device components, circuits, units, modules, blocks, or portions may have modular configurations, or are composed of discrete components, but nonetheless can be referred to as "modules" in general. In other words, the "circuits," "components," "modules" or "units" referred to herein may or may not be in modular forms.

The displaying module 1410 is configured to display a first always-on interface. The first always-on interface is an interface displayed when the terminal is in the always-on display state. The first always-on interface includes a target control for calling out a target function item in the first always-on interface.

The receiving module 1420 is configured to receive a first selection operation on the target control.

The displaying module 1410 is further configured to display an intermediate state interface according to the first selection operation. The intermediate state interface includes an interaction area of the target function item, and the intermediate state interface is an interface displayed when the terminal is in the half always-on display state. The half always-on display state is used to indicate that the terminal is in a state between the always-on display state and a screen-locked state.

In an alternative embodiment, the displaying module 1410 is further configured to display a second always-on interface according to the first selection operation. The second always-on interface is an interface displayed when the terminal is in the always-on display state. The second always-on interface includes a preset control for confirming the calling out of the target function item.

The receiving module 1420 is further configured to receive a second selection operation on the preset control.

The displaying module 1410 is further configured to display the intermediate state interface according to the second selection operation.

In an alternative embodiment, the receiving module 1420 is further configured to receive a first click operation on a preset area; and the first always-on interface is displayed according to the first click operation;

or the receiving module 1420 is further configured to receive a second click operation on the preset area; and a screen-locked interface is displayed according to the second click operation, and the screen-locked interface is an interface displayed when the terminal is in the screen-locked stat;

or the receiving module 1420 is further configured to receive a triggering operation on a screen-locked button of the terminal; and the first always-on interface is displayed according to the triggering operation.

In an alternative embodiment, the displaying module 1410 is further configured to perform an always-on processing on the display screen of the terminal according to the triggering operation; and the first always-on interface is displayed after a preset duration of the always-on processing.

In an alternative embodiment, the target function item includes a first content viewing function item, the target control includes a viewing control, and the intermediate state interface includes a displaying area of the first content.

In an alternative embodiment, the first content includes at least one of a target to-do list, a target schedule, a timing progress of a timer, a sound recording state, a music playing state, or a network car booking state.

In an alternative embodiment, the target function item includes a second content editing function item, the target control includes a creating and editing control, and the intermediate state interface includes an editing area of the second content.

In an alternative embodiment, the editing area of the second content includes at least one of a note editing area, a to-do list editing area, or a schedule editing area.

In an alternative embodiment, the target function item includes a notification message viewing function item; the target control includes a notification message prompting control, and the notification message prompting control is a control displayed when the terminal receives a target notification message; and the intermediate state interface includes a displaying area of the target notification message.

In view of the above, with respect to the apparatus for applying an always-on interface according to this embodiment, a target control is added in the always-on interface, and when a first selection operation on the target control is received, the state of the terminal is switched from the always-on display state to the half always-on display state, and thus a target function item is applied in the intermediate state interface of the half always-on display state, and the application modes of the always-on interface are increased by increasing the intermediate state interface of the half always-on display state, which improves the utilization efficiency of the always-on interface.

It should be noted that the apparatus for applying an always-on interface according to the foregoing embodiments is only illustrated according to the division of the foregoing functional modules. In actual applications, the above functions may be completed by different functional modules as needed, that is, the internal structure of the device is divided into different functional modules to complete all or part of the functions described above. In addition, the apparatus for applying an always-on interface and the method for applying an always-on interface according to the foregoing embodiments belong to the same concept, and the specific implementation process thereof refer to the method embodiments, which will not be described herein again.

Figure 15:
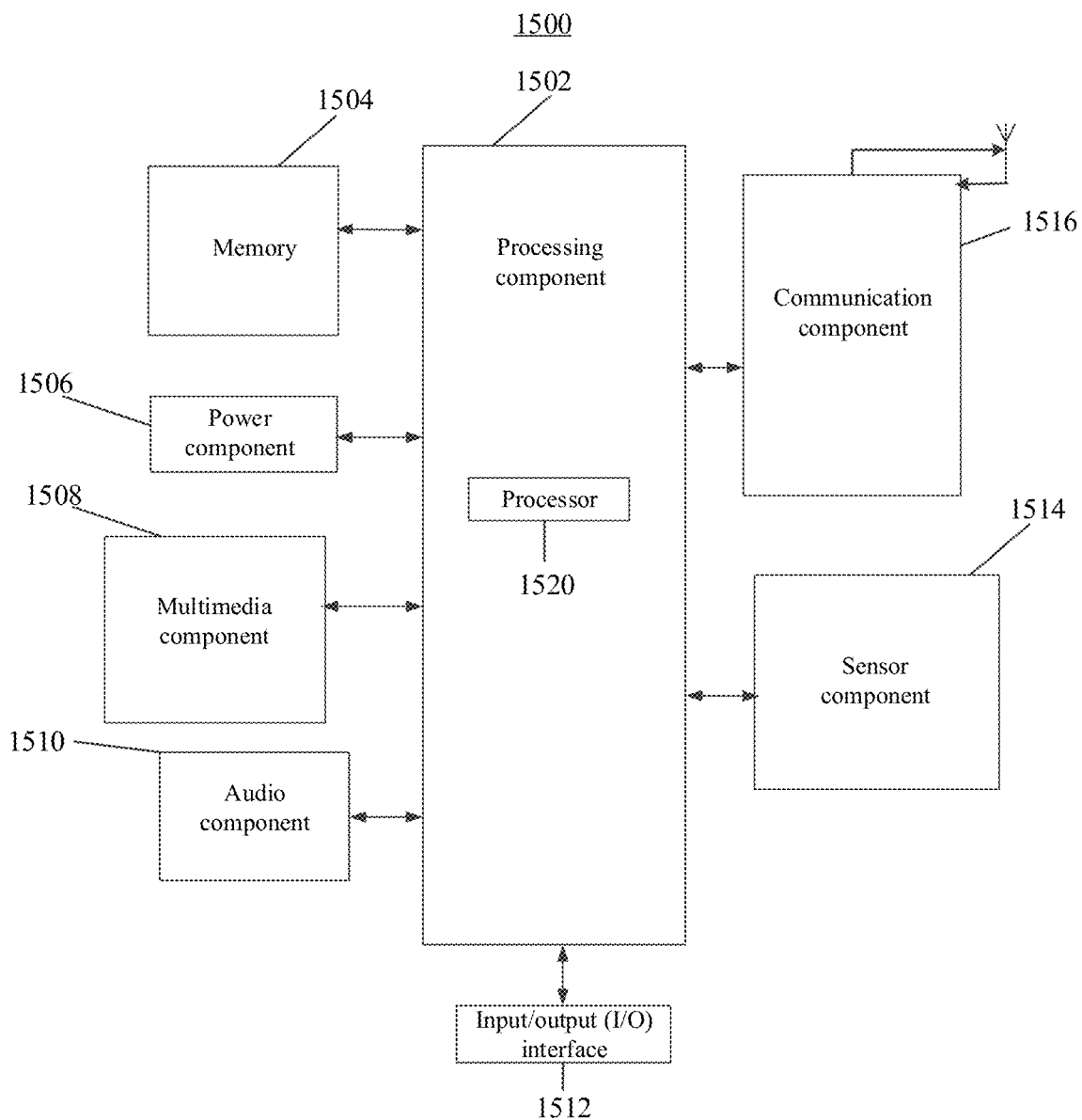
FIG. 15 is a structural block diagram of the computer device according to some embodiments of the present disclosure.

FIG. 15 is a block diagram of a computer device 1500 according to some embodiments. For example, the computer device 1500 may be the terminal described above. For example, the terminal may be an electronic device such as a mobile phone, a tablet computer, an e-book reader, a multimedia playback device, a PC, a wearable device.

Referring to FIG. 12, the computer device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls the overall operations of the computer device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1308 and the processing component 1502.

The memory 1504 is configured to store various types of data to support the operation of the computer device 1500. Examples of such data include instructions for any applications or methods operated on the computer device 1500, contact data, phonebook data, messages, pictures, videos, etc. The memory 1504 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the computer device 1500. The power component 1506 may include a power management system, one or more power sources, and any other components associated with the generation, management, and distribution of power in the computer device 1500.

The multimedia component 1508 includes a screen providing an output interface between the computer device 1500 and the user. In some embodiments, the screen may include a liquid crystal display (LCD) and a touch panel (TP). In some embodiments, the screen can be other types of displays, such as organic light-emitting diode (OLED) displays.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1508 includes a front camera and/or a rear camera. The front camera and the rear camera may receive external multimedia data while the computer device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone (MIC) configured to receive external audio signals when the computer device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker for outputting audio signals.

The I/O interface 1512 provides an interface between the processing component 1502 and peripheral interface modules, such as a keyboard, a click wheel, buttons, and the like. The buttons may include, but are not limited to, a home button, a volume button, a start button, and a lock button.

The sensor component 1514 includes one or more sensors to provide status assessments of various aspects of the computer device 1500. For instance, the sensor component 1514 may detect an on/off status of the computer device 1500, relative positioning of components, e.g., the display device and the mini keyboard of the computer device 1500, and the sensor component 1514 may also detect a position change of the computer device 1500 or a component of the computer device 1500, presence or absence of user contact with the computer device 1500, orientation or acceleration/deceleration of the computer device 1500, and temperature change of the computer device 1500. The sensor component 1514 may include a proximity sensor configured to detect the presence of nearby objects without any physical contact. The sensor component 1514 may also include a light sensor, such as a CMOS or CCD image sensor, used for imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the computer device 1500 and other devices. The computer device 1500 can access a wireless network based on a communication standard, such as Wi-Fi, 2G, 3G, 4G, or 5G, or a combination thereof. In some embodiments, the communication component 1316 receives broadcast signals or broadcast associated information from an external broadcast management system via a broadcast channel. In some embodiments, the communication component 1516 further includes a near field communication (NFC) module to facilitate short-range communications.

In some embodiments, the computer device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium including instructions is also provided, such as the memory 1504 including instructions, executable by the processor in the computer device 1500, for performing the above-described methods. For example, the non-transitory computer-readable storage medium may be a ROM, a RAM, a CD-ROM, a magnetic tape, a floppy disc, an optical data storage device, and the like.

An embodiment of the present disclosure further provides a computer device. The computer device includes a memory and a processor. At least one instruction, at least one program, a set of codes or a set of instructions is stored on the memory, and is loaded and executed by the processor to implement the above method for applying an always-on interface.

Various embodiments of the present disclosure further provide a computer readable storage medium. at least one instruction, at least one program, a set of codes or a set of instructions is stored on the readable storage medium, and is loaded and executed by the processor to implement the above method for applying an always-on interface.

Various embodiments of the present disclosure further provide a computer program product which, when executed on a computer, causes the computer to perform the above method for applying an always-on interface according to the various method embodiments.

In some embodiments of the present disclosure, a method for applying an always-on interface is provided, wherein the method comprises:

displaying a first always-on interface, wherein the first always-on interface is an interface displayed when a terminal is in an always-on display state, and the first always-on interface comprises a target control for calling out a target function item in the first always-on interface;

receiving a first selection operation on the target control; and displaying an intermediate state interface according to the first selection operation, wherein the intermediate state interface comprises an interaction area of the target function item, and the intermediate state interface is an interface displayed when the terminal is in a half always-on display state, and wherein the half always-on display state is used to indicate that the terminal is in a state between the always-on display state and a screen-locked state.

In some embodiments, displaying the intermediate state interface according to the first selection operation comprises:

displaying a second always-on interface according to the first selection operation, wherein the second always-on interface is an interface displayed when the terminal is in the always-on display state, and the second always-on interface comprises a preset control for confirming the calling out of the target function item;

receiving a second selection operation on the preset control; and displaying the intermediate state interface according to the second selection operation.

In some embodiments, after displaying the intermediate state interface according to the first selection operation, the method further comprises:

receiving a first click operation on a preset area; and displaying the first always-on interface according to the first click operation, or, receiving a second click operation on the preset area; and displaying a screen-locked interface according to the second click operation, wherein the screen-locked interface is an interface displayed when the terminal is in the screen-locked state, or, receiving a triggering operation on a screen-locked button of the terminal; and displaying the first always-on interface according to the triggering operation.

In some embodiments, displaying the first always-on interface according to the triggering operation comprises:

performing an always-on processing on a display screen of the terminal according to the triggering operation; and displaying the first always-on interface after a preset duration of the always-on processing.

In some embodiments, the target function item comprises a first content viewing function item, the target control comprises a viewing control, and the intermediate state interface comprises a displaying area of the first content.

In some embodiments, the first content comprises at least one of a target to-do list, a target schedule, a timing progress of a timer, a sound recording state, a music playing state, or a network car booking state.

In some embodiments, the target function item comprises a second content editing function item, the target control comprises a creating and editing control, and the intermediate state interface comprises an editing area of the second content.

In some embodiments, the editing area of the second content comprises at least one of a note editing area, a to-do list editing area, or a schedule editing area.

In some embodiments, the target function item comprises a notification message viewing function item, and the target control comprises a notification message prompting control, wherein the notification message prompting control is a control displayed when the terminal receives a target notification message, and the intermediate state interface comprises a displaying area of the target notification message.

In some embodiments of the present disclosure, an apparatus for applying an always-on interface is provided, wherein the apparatus comprises:

a displaying module configured to display a first always-on interface, wherein the first always-on interface is an interface displayed when a terminal is in an always-on display state, and the first always-on interface comprises a target control for calling out a target function item in the first always-on interface;

a receiving module configured to receive a first selection operation on the target control;

wherein the displaying module is further configured to display an intermediate state interface according to the first selection operation, and the intermediate state interface comprises an interaction area of the target function item, and the intermediate state interface is an interface displayed when the terminal is in a half always-on display state, and wherein the half always-on display state is used to indicate that the terminal is in a state between the always-on display state and a screen-locked state.

In some embodiments, the displaying module is further configured to display a second always-on interface according to the first selection operation, and the second always-on interface is an interface displayed when the terminal is in the always-on display state, and the second always-on interface comprises a preset control for confirming the calling out of the target function item;

the receiving module is further configured to receive a second selection operation on the preset control; and the displaying module is further configured to display the intermediate state interface according to the second selection operation.

In some embodiments, the receiving module is further configured to receive a first click operation on a preset area; and the first always-on interface is displayed according to the first click operation, or, the receiving module is further configured to receive a second click operation on the preset area; and a screen-locked interface is displayed according to the second click operation, wherein the screen-locked interface is an interface displayed when the terminal is in the screen-locked state, or, the receiving module is further configured to receive a triggering operation on a screen-locked button of the terminal; and the first always-on interface is displayed according to the triggering operation.

In some embodiments, the displaying module is further configured to perform an always-on processing on a display screen of the terminal according to the triggering operation; and the first always-on interface is displayed after a preset duration of the always-on processing.

In some embodiments of the present disclosure, a computer device is provided, wherein the computer device comprises a processor and a memory, and at least one instruction, at least one program, a set of codes or a set of instructions is stored on the memory, and is loaded and executed by the processor to implement the method for applying an always-on interface in the above embodiments.

In some embodiments of the present disclosure, a non-transitory computer-readable storage medium is provided, wherein at least one instruction, at least one program, a set of codes or a set of instructions is stored on the readable storage medium, and is loaded and executed by the processor to implement the method for applying an always-on interface in the above embodiments.

In some embodiments of the present disclosure, a computer program product is provided which, when executed on a computer, causes the computer to perform the above method for applying an always-on interface always-on interface according to the embodiments of the present application.

It is to be understood that the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

In the present disclosure, it is to be understood that the terms "lower," "upper," "front," "back," "left," "right," "top," "bottom," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the methods and operations can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for applying an always-on interface, comprising:
   displaying a first always-on interface, wherein the first always-on interface is an interface displayed when a terminal is in an always-on display state, and the first always-on interface comprises a target control for calling out a target function item in the first always-on interface;
   receiving a first selection operation on the target control; and
   displaying an intermediate state interface according to the first selection operation, wherein the intermediate state interface comprises an interaction area of the target function item, and the intermediate state interface is an interface displayed when the terminal is in a half always-on display state, and wherein the half always-on display state is used to indicate that the terminal is in a state between the always-on display state and a screen-locked state,
   wherein the displaying the intermediate state interface according to the first selection operation comprises:
      displaying a second always-on interface according to the first selection operation, wherein the second always-on interface is an interface displayed when the terminal is in the always-on display state, and the second always-on interface comprises a preset control for confirming the calling out of the target function item;
      receiving a second selection operation on the preset control; and
      displaying the intermediate state interface according to the second selection operation.

2. The method according to claim 1, wherein after displaying the intermediate state interface according to the first selection operation, the method further comprises:
   receiving a first click operation on a preset area; and
      displaying the first always-on interface according to the first click operation,
   or,
   receiving a second click operation on the preset area; and
      displaying a screen-locked interface according to the second click operation, wherein the screen-locked interface is an interface displayed when the terminal is in the screen-locked state,
   or,
   receiving a triggering operation on a screen-locked button of the terminal; and displaying the first always-on interface according to the triggering operation.

3. The method according to claim 2, wherein displaying the first always-on interface according to the triggering operation comprises:
   performing an always-on processing on a display screen of the terminal according to the triggering operation; and
   displaying the first always-on interface after a preset duration of the always-on processing.

4. The method according to claim 1, wherein
the target function item comprises a first content viewing function item, the target control comprises a viewing control, and the intermediate state interface comprises a displaying area of the first content.

5. The method according to claim 4, wherein:
the first content comprises at least one of a target to-do list, a target schedule, a timing progress of a timer, a sound recording state, a music playing state, or a network car booking state.

6. The method according to claim 1, wherein
the target function item comprises a second content editing function item, the target control comprises a creating and editing control, and the intermediate state interface comprises an editing area of the second content.

7. The method according to claim 6, wherein:
the editing area of the second content comprises at least one of a note editing area, a to-do list editing area, and a schedule editing area.

8. The method according to claim 1, wherein
the target function item comprises a notification message viewing function item, and the target control comprises a notification message prompting control, wherein the notification message prompting control is a control displayed when the terminal receives a target notification message, and the intermediate state interface comprises a displaying area of the target notification message.

9. A computer device comprising a processor and a memory, wherein at least one instruction, at least one program, a set of codes or a set of instructions is stored in the memory, and is loaded and executed by the processor to implement:
displaying a first always-on interface, wherein the first always-on interface is an interface displayed when a terminal is in an always-on display state, and the first always-on interface comprises a target control for calling out a target function item in the first always-on interface;
receive a first selection operation on the target control; and
display an intermediate state interface according to the first selection operation, wherein the intermediate state interface comprises an interaction area of the target function item, and the intermediate state interface is an interface displayed when the terminal is in a half always-on display state, and wherein the half always-on display state is used to indicate that the terminal is in a state between the always-on display state and a screen-locked state,
wherein the displaying the intermediate state interface according to the first selection operation comprises:
displaying a second always-on interface according to the first selection operation, wherein the second always-on interface is an interface displayed when the terminal is in the always-on display state, and the second always-on interface comprises a preset control for confirming the calling out of the target function item;
receiving a second selection operation on the preset control; and
displaying the intermediate state interface according to the second selection operation.

10. The computer device according to claim 9, wherein after displaying the intermediate state interface according to the first selection operation, the processor is further configured to:
receive a first click operation on a preset area; and display the first always-on interface according to the first click operation,
or,
receive a second click operation on the preset area; and display a screen-locked interface according to the second click operation, wherein the screen-locked interface is an interface displayed when the terminal is in the screen-locked state,
or,
receive a triggering operation on a screen-locked button of the terminal; and display the first always-on interface according to the triggering operation.

11. The computer device according to claim 10, wherein displaying the first always-on interface according to the triggering operation comprises:
performing an always-on processing on a display screen of the terminal according to the triggering operation; and
displaying the first always-on interface after a preset duration of the always-on processing.

12. The computer device according to claim 9, wherein the target function item comprises a first content viewing function item, the target control comprises a viewing control, and the intermediate state interface comprises a displaying area of the first content.

13. The computer device according to claim 12, wherein:
the first content comprises at least one of a target to-do list, a target schedule, a timing progress of a timer, a sound recording state, a music playing state, or a network car booking state.

14. The computer device according to claim 9, wherein the target function item comprises a second content editing function item, the target control comprises a creating and editing control, and the intermediate state interface comprises an editing area of the second content.

15. The computer device according to claim 14, wherein:
the editing area of the second content comprises at least one of a note editing area, a to-do list editing area, or a schedule editing area.

16. The computer device according to claim 9, wherein the target function item comprises a notification message viewing function item, and the target control comprises a notification message prompting control, wherein the notification message prompting control is a control displayed when the terminal receives a target notification message, and the intermediate state interface comprises a displaying area of the target notification message.

17. A non-transitory computer-readable storage medium, wherein at least one instruction, at least one program, a set of codes or a set of instructions is stores on the non-transitory computer-readable storage medium, and is loaded and executed by a processor to implement steps of the method according to claim 1.

18. A mobile terminal implementing a method
for applying an always-on interface, the method comprising:
displaying a first always-on interface, wherein the first always-on interface is an interface displayed when a terminal is in an always-on display state, and the first always-on interface comprises a target control for calling out a target function item in the first always-on interface;
receiving a first selection operation on the target control; and
displaying an intermediate state interface according to the first selection operation, wherein the intermediate state interface comprises an interaction area of the target function item, and the intermediate state interface is an interface displayed when the terminal is in a half always-on display state, and wherein the half always-on display state is used to indicate that the terminal is in a state between the always-on display state and a screen-locked state;
the mobile terminal comprising a display screen configured to display the always-on interface, wherein display content in the first always-on interface is displayed in a positionally variable manner in the first always-on interface to reduce screen burn at fixed positions; and wherein the target function item is implemented as ride sharing application, the first always-on interface is configured to display a network vehicle viewing control including license plate number and estimated time of arrival of a reserved vehicle; upon a click operation on the network vehicle viewing control is received, the intermediate state interface is displayed, and includes a network vehicle booking state viewing area.

* * * * *